US008515347B2

(12) United States Patent
Appleyard et al.

(10) Patent No.: US 8,515,347 B2
(45) Date of Patent: *Aug. 20, 2013

(54) INTELLIGENT DEVICE INTEGRATION USING RFID TECHNOLOGY

(75) Inventors: James P. Appleyard, North Richland Hills, TX (US); Shannon Hardt, Keller, TX (US); Shiju Mathai, Carrollton, TX (US)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/447,892

(22) Filed: Apr. 16, 2012

(65) Prior Publication Data

US 2012/0194867 A1  Aug. 2, 2012

Related U.S. Application Data

(60) Continuation of application No. 13/195,602, filed on Aug. 1, 2011, which is a division of application No. 11/539,870, filed on Oct. 9, 2006, now Pat. No. 8,023,889.

(51) Int. Cl.
*H04B 5/00* (2006.01)

(52) U.S. Cl.
USPC ........ 455/41.1; 455/41.2; 455/403; 340/10.1; 340/10.6

(58) Field of Classification Search
USPC ............. 455/41.1, 41.2, 403; 340/10.1, 10.6, 340/572.1
See application file for complete search history.

(56) References Cited

U.S. PATENT DOCUMENTS

| 6,912,398 | B1 | 6/2005 | Domnitz |
| 7,123,706 | B2 | 10/2006 | Ooki |
| 7,190,956 | B2 | 3/2007 | Dorenbosch et al. |
| 7,394,372 | B2 | 7/2008 | Gloekler et al. |
| 2002/0133545 | A1* | 9/2002 | Fano et al. ............... 709/203 |
| 2002/0173308 | A1 | 11/2002 | Dorenbosch et al. |
| 2003/0078979 | A1 | 4/2003 | Sagi |
| 2004/0203895 | A1 | 10/2004 | Balasuriya |
| 2005/0015483 | A1 | 1/2005 | Carter et al. |
| 2005/0054290 | A1 | 3/2005 | Logan et al. |
| 2005/0105734 | A1 | 5/2005 | Buer et al. |
| 2005/0147133 | A1 | 7/2005 | Tang et al. |
| 2005/0242167 | A1 | 11/2005 | Kaario et al. |
| 2005/0259612 | A1 | 11/2005 | Yarlagadda |
| 2005/0285739 | A1 | 12/2005 | Velhal et al. |
| 2006/0009155 | A1 | 1/2006 | Paalasmaa et al. |
| 2006/0031293 | A1 | 2/2006 | Thommes et al. |

(Continued)

OTHER PUBLICATIONS

Klaseen, E.L., et al., "The Definition of Interoperability Architectures for Intelligent Devices Using Abstract Models," Inf. Telecommun. & Autom. Div., SRI Int., Proc. WFCS '95, IEEE Int'l. Worshop on Factory Communication Systems, pp. 237-245, Oct. 4-6, 1994.

*Primary Examiner* — Tuan H Nguyen
(74) *Attorney, Agent, or Firm* — Cuenot, Forsythe & Kim, LLC

(57) ABSTRACT

A method of integrating devices using radio frequency identification (RFID) technology can include tracking movement of an RFID tag, wherein the RFID tag is associated with a user, and determining proximity of the RFID tag to a communication device. The method also can include initiating a programmatic action with the communication device according to the proximity of the RFID tag to the communication device, wherein the programmatic action is associated with the user.

12 Claims, 4 Drawing Sheets

(56) References Cited

U.S. PATENT DOCUMENTS

| | | |
|---|---|---|
| 2006/0031367 A1 | 2/2006 | Buford et al. |
| 2006/0044153 A1 | 3/2006 | Dawidowsky |
| 2006/0047761 A1 | 3/2006 | Kaplan et al. |
| 2006/0174010 A1 | 8/2006 | Deshpande |
| 2006/0256959 A1 | 11/2006 | Hymes |
| 2006/0258442 A1 | 11/2006 | Ryan |
| 2007/0024892 A1* | 2/2007 | Cho .......................... 358/1.14 |
| 2007/0040681 A1 | 2/2007 | Jessup |
| 2007/0043820 A1 | 2/2007 | George et al. |
| 2007/0260730 A1 | 11/2007 | Gadwale |
| 2008/0059338 A1 | 3/2008 | Hubbard |
| 2008/0217551 A1 | 9/2008 | Zhang et al. |
| 2008/0299948 A1 | 12/2008 | Rosener |
| 2009/0066510 A1 | 3/2009 | Kamdar et al. |
| 2009/0172105 A1 | 7/2009 | Cruz et al. |

* cited by examiner

| Incoming Telephone Call | Instant Message | Mobile Phone | Landline |
|---|---|---|---|
| At Desk | - | Try Connection 2nd | Try Connection 1st |
| Roaming the Office | - | Try Connection | - |
| At Another Location | - | Try Connection 2nd | Try Connection 1st |
| Out of the Office | - | Try Connection 1st | Voice Mail 2nd |

FIG. 2

| Incoming Text Message | Instant Message | Mobile Phone | Landline |
|---|---|---|---|
| At Desk | Send | - | - |
| Roaming the Office | - | Short Message Service | - |
| At Another Location | - | Text-To-Speech 2nd | Text-To-Speech 1st |
| Out of the Office | - | Short Message Service 1st | Voice Mail 2nd |

FIG. 3

INTELLIGENT DEVICE INTEGRATION USING RFID TECHNOLOGY

CROSS-REFERENCE TO RELATED APPLICATIONS

This application is a continuation of U.S. application Ser. No. 13/195,602, entitled INTELLIGENT DEVICE INTEGRATION USING RFID TECHNOLOGY, and filed Aug. 1, 2011, which is a divisional of U.S. application Ser. No. 11/539,870, entitled INTELLIGENT DEVICE INTEGRATION USING RFID TECHNOLOGY and filed on Oct. 9, 2006, now U.S. Pat. No. 8,023,889 issued Sep. 20, 2011, the entirety of which is fully incorporated herein by reference.

BACKGROUND OF THE INVENTION

The different ways in which people communicate continue to expand at a rapid pace. Communication systems such as electronic mail, instant messaging, video conferencing, and Web conferencing, for example, have become widespread despite being relatively new technologies. The ability to communicate through these different mediums also has allowed users to become mobile. Users are no longer tethered to a desktop workstation or one particular communication device. Instead, users typically utilize several communication devices, i.e., desktop computers, portable computers, personal digital assistants, pagers, mobile phones, etc.

When attempting to reach a user, however, it is not always evident which communication system will be effective in delivering a message. If the recipient is at his or her desk, then a telephone call to the user's work line will likely be effective. If the user is traveling, an instant message or a telephone call to the user's mobile phone may be more appropriate. Still, an electronic mail can be effective if the intended recipient has electronic mail access.

Presently, there is no reliable way to determine which means of communication is likely to be more effective in reaching an intended recipient. Further, in cases where the intended recipient is not in the office, it is often the case that the recipient either forgets to forward messages, i.e., from a landline to a mobile phone, or opts not to forward messages to avoid what may be perceived as a tedious process.

SUMMARY

One embodiment of the present invention can include a method of integrating devices using radio frequency identification (RFID) technology. The method can include tracking movement of an RFID tag, wherein the RFID tag is associated with a user, and determining proximity of the RFID tag to a communication device. The method also can include initiating a programmatic action with the communication device according to the proximity of the RFID tag to the communication device, wherein the programmatic action is associated with the user.

Yet another embodiment of the present invention can include a computer readable storage being programmed to cause a machine to perform the various steps and/or functions described herein.

BRIEF DESCRIPTION OF THE SEVERAL VIEWS OF THE DRAWINGS

FIG. 2 is a table illustrating telephone call handling in accordance with another aspect of the present invention.

FIG. 3 is a table illustrating text message handling in accordance with another aspect of the present invention.

DETAILED DESCRIPTION

Figure 1:
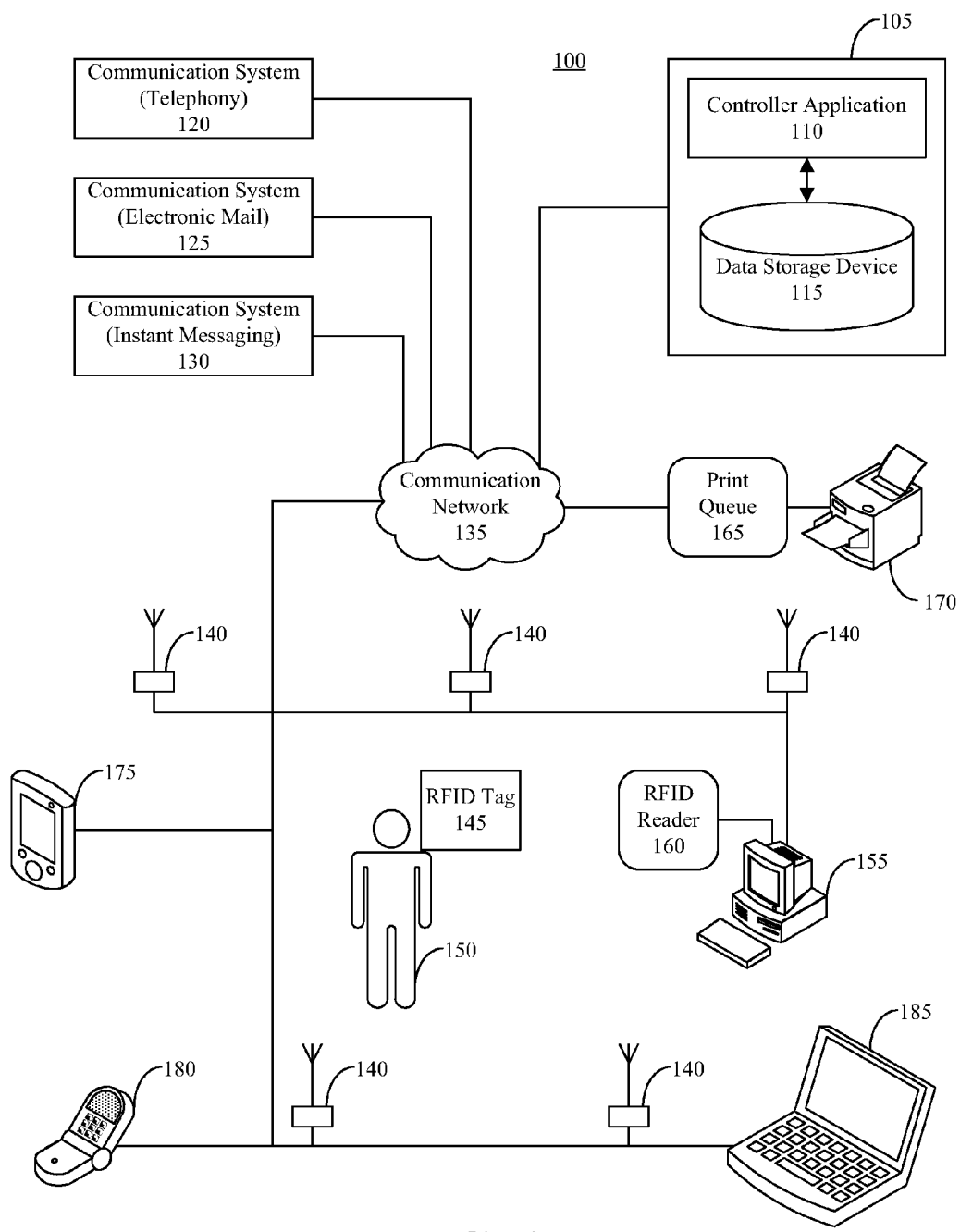
FIG. 1 is a block diagram illustrating a system in accordance with one aspect of the present invention.

As will be appreciated by one skilled in the art, the present invention may be embodied as a method, system, or computer program product. Accordingly, the present invention may take the form of an entirely hardware embodiment, an entirely software embodiment (including firmware, resident software, micro-code, etc.) or an embodiment combining software and hardware aspects that may all generally be referred to herein as a "circuit", "module", or "system". Furthermore, the present invention may take the form of a computer program product on a computer-usable storage medium having computer-usable program code embodied in the medium.

Any suitable computer usable or computer readable medium may be utilized. The computer-usable or computer-readable medium may be, for example but not limited to, an electronic, magnetic, optical, electromagnetic, infrared, or semiconductor system, apparatus, device, or propagation medium. More specific examples (a non-exhaustive list) of the computer-readable medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a transmission media such as those supporting the Internet or an intranet, or a magnetic storage device. Note that the computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory. In the context of this document, a computer-usable or computer-readable medium may be any medium that can contain, store, communicate, propagate, or transport the program for use by or in connection with the instruction execution system, apparatus, or device. The computer-usable medium may include a propagated data signal with the computer-usable program code embodied therewith, either in baseband or as part of a carrier wave. The computer usable program code may be transmitted using any appropriate medium, including but not limited to the Internet, wireline, optical fiber cable, RF, etc.

Computer program code for carrying out operations of the present invention may be written in an object oriented programming language such as Java, Smalltalk, C++ or the like. However, the computer program code for carrying out operations of the present invention may also be written in conventional procedural programming languages, such as the "C" programming language or similar programming languages. The program code may execute entirely on the user's computer, partly on the user's computer, as a stand-alone software package, partly on the user's computer and partly on a remote computer, or entirely on the remote computer or server. In the latter scenario, the remote computer may be connected to the user's computer through a local area network (LAN) or a wide area network (WAN), or the connection may be made to an external computer (for example, through the Internet using an Internet Service Provider).

The present invention is described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable memory that can direct a computer or other programmable data processing apparatus to function in a particular manner, such that the instructions stored in the computer-readable memory produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions/acts specified in the flowchart and/or block diagram block or blocks.

Embodiments of the present invention are directed to the use of radio frequency identification (RFID) technology with intelligent devices. RFID tags can be associated with users such that the movements, location, and/or proximity of users to various communication devices can be tracked via the RFID tags. As users move closer or farther from particular communication devices, different functions can be implemented. These functions can be implemented within the devices themselves or can be implemented within other, "outside" systems, i.e., to automate message routing and the like. As used herein, a communication device can include, but is not limited to, a computer system whether desktop or portable, a mobile phone, a personal digital assistant, a printer, or any other device capable of communicating over a network.

FIG. 1 is a block diagram illustrating a system 100 in accordance with one aspect of the present invention. The system 100 can include a central controller 105 that is configured to determine locations for users and use such information to work cooperatively with various communication systems and/or communication devices. As shown, communication systems can include, but are not limited to, a telephony system 120, an electronic mail system 125, and an instant messaging system 130. Further examples of communication systems which can be used with the embodiments disclosed herein, without limitation, are a video conferencing system, a virtual meeting and/or desktop conferencing system, a message translation and/or formatting system, etc.

The central controller 105 can be implemented as one or more computer systems capable of executing application programming, such as the controller application 110. The controller application 110 can include the logic necessary to cause the central controller 105 to perform the various steps and/or functions disclosed herein. The central controller 105 further can include a data storage device 115, or have access to such a device via a network, i.e., such as communication network 135. The central controller 105 further can include one or more adapter programs (not shown) which facilitate communication between the controller application 110 and the communication systems 120-130.

The central controller 105 can communicate with the communication systems 120-130, as well as with the other devices to be described herein via communication network 135. The communication network 135 can be implemented as, or include, without limitation, a WAN, a LAN, the Public Switched Telephone Network (PSTN), the Web, the Internet, and one or more intranets. The communication network 135 further can include one or more wireless networks, whether short or long range. For example, in terms of short range wireless networks, the communication network 135 can include a local wireless network built using a Bluetooth or an 802-type wireless communication protocol. In terms of long range wireless networks, the communication network 135 can include a mobile, cellular, and or satellite-based wireless network and support voice, video, text, and/or any combination thereof.

Under the control of the controller application 110 and through the communication network 135, the central controller 105 can communicate with the antennae 140. Each of the antenna 140 can be a radio frequency (RF) antennae capable of communicating with, or detecting RFID tags, such as RFID tag 145. As shown, the RFID tag 145 can be carried on the person of a user 150. The identifying information encoded into the RFID tag 145 can be logically associated with the user 150, or a user profile of the user, within the central controller 105, i.e., within the data storage device 115.

While each of the antennae 140 can be attached to its own information processing node and/or station, in another embodiment, each can be directly connected to the central controller 105 via the communication network 135. The link between the antennae 140 and the central controller 105 can be a wired connection or a wireless connection as discussed with reference to the communication network 135. In any case, the central controller 105 can determine a location of the RFID tag 145 using the antennae 140. For example, techniques including, but not limited to, triangulation, phase shift, round trip signal time, and the like can be used to determine a location of RFID tag 125, and therefore, the user 150.

It further should be appreciated that any communication device, such as computer system 155, having an RFID reader 160 attached thereto, which is capable of detecting an RFID tag also can provide location information pertaining to the RFID tag 145 back to the central controller 105. That is, when the RFID reader 160 detects the RFID tag 145, the RFID reader 160 can communicate such information to the computer system 160, which, in turn, can notify the central controller 105. Thus, the central controller 105 is aware that, at a minimum, the RFID tag 145 is within detectable range of the location of computer system 155. Using the information available from the antennae 140 and suitably equipped devices such as computer system 155, the central controller 105 can continually track and/or monitor the location of one or more RFID tags such as RFID tag 125. Further, it should be appreciated that while only one user is depicted in FIG. 1, that many more users, and communication devices for that matter, can be incorporated into system 160 and, as such, the embodiments discussed herein are not intended to be limited by the number of users and/or devices involved.

The RFID reader 160 can read and/or detect RFID tags such as RFID tag 145. It should be appreciated that the manner in which the RFID reader 160 is linked with computer system 155 is not intended to limit the present invention. For example, the RFID reader 160 can be linked with the computer system 155 as a standard peripheral device, can be integrated directly into, or within, the computer system 155, or can be connected via wireless communication, such as through a Bluetooth connection or other short-range wireless communication link.

In one embodiment, the RFID tag 145 can be an active tag with an internal power source. In that case, the RFID tag 145 can emit an RF signal that can be detected by the RFID reader 160 when the RFID tag 145 is in range of the RFID reader 160. The RFID reader 160 can process received RF signals from the RFID tag 145 to accurately determine unique identifying information imprinted or programmed into the RFID tag 145.

In another embodiment, the RFID tag 145 can be a passive device that can be interrogated by an RF field emitted by the RFID reader 160. When interrogated, the RFID tag 145 can become active. The RFID tag 145 can detect the presence of the field of the RFID reader 160 and subsequently activate to send data. Like its active RFID tag counterpart, a passive RFID tag can communicate with the RFID reader 160 via wireless RF communication links that are not limited to line of sight operation.

The central controller 105 further can include information specifying the position or location of the various communication devices shown. In one embodiment, stationary devices such as the computer system 155 and the printer 170 can be assigned fixed locations that can be programmed into the central controller 105, i.e., stored with the data storage device 115 and/or preconfigured within the controller application 110. In another embodiment, stationary devices can be attached to, and logically associated with, RFID tags (not shown) such that the location of devices such as computer system 155 and printer 170 can be determined dynamically as discussed herein.

The mobile devices such as the personal digital assistant 175, the mobile phone 180, and the portable computer 185, also can be equipped with RFID tags so that the central controller 105 can dynamically determine the location of such devices, at least when within range of the antennae 140. In another embodiment, such devices can include Global Positioning System (GPS) systems and be configured to provide location information back to the central controller 105. In any case, the position, or location, of such mobile devices also can be determined.

In operation, the central controller 105 can track the location of the user 150 via detection of the RFID tag 145. The central controller 105 can determine proximity of the RFID tag 145 to different communication devices as the user moves about, i.e., within an office building, a room, a dwelling, etc. In one embodiment, the user 150 can be considered, by the central controller 105, to be proximate to a device when within a predetermined distance of that device. For example, with regard to the computer system 155, the user can be said to be proximate to the computer system 155 when located within 5 feet of the device, 3 feet of the device, or 10 feet of the device. In another embodiment, a user can be said to be proximate to a device when the RFID tag associated with that user is detected by an RFID reader associated with the device. Thus, for example, the user 150 can be said to be proximate to the computer system 155 when RFID tag 145 is detected by RFID reader 160.

As user 150 motion is tracked, the controller application 110, working in cooperation with different client applications, can initiate various actions within the different devices shown. For example, when the controller application 110 determines that the user 150 is no longer proximate to computer system 155, the controller application 110 can instruct a client application executing within the computer system 155 to automatically log the user 150 off of the computer system 155. Similarly, the controller application 110 can instruct the client application within the computer system 155 to automatically log the user 150 back onto the system when the controller application 110 determines that the user 150 is once again proximate to the computer system 155. In another example, such actions can be initiated by the computer system 155. That is, the computer system 155, having detected the RFID 145 via the RFID reader 160, can perform or initiate one or more programmatic actions. The computer system 155 then can notify the central controller 105 that the user 150 is near or proximate thereto.

In another embodiment, programmatic actions involving multiple devices can be initiated, which incorporate user proximity and/or location information in a dynamic fashion. For example, the user 150 can initiate a print job from computer system 155. The print job can be directed to printer 170 and stored, temporarily, in print queue 165. When the user leaves computer system 155 to retrieve the printed document, the user can be logged off of the computer system 155 as described. The print job can be maintained within the print queue 165 until such time that the user 150 is determined to be proximate to the printer 170. At that time, the print job can be released from the print queue 165 and printed on printer 170.

If the user 150 is not determined to be proximate to the printer 170 within a predetermined amount of time, i.e., several hours or within a full 24 hour period, for example, the print job can be purged from the print queue 165. It should be appreciated that in one embodiment, the printer 170 can include an RFID reader to detect the presence or proximity of the user such that the determination as to when to release or purge the print job is completely performed within the printer 170. In another embodiment, the printer 170 can be notified that the user is proximate by the central controller 105.

In yet another aspect of the present invention, various communications can be routed between different devices based, at least in part, upon the location of the user 150 and/or his or her proximity to various communication devices. In one embodiment, when a communication is received by a communication system, i.e., communication system 120, the communication system 120 can send a notifying event to the central processor 105. The notifying event can indicate an address to which the communication was directed. Since communication system 120 is a telephony system, the address can be a telephone number. If the communication system used in the example discussed herein were the electronic mail system, the address would be an electronic mail address, or a username, etc., in the case of an instant message type of communication.

The central processor 105 can identify a user associated according to the communication address to which the communication is directed. The central processor 105 further can determine a location for that user, i.e., by looking up the particular RFID tag associated with the user and detecting the location of the RFID tag 145 or its proximity to any communication devices. The incoming communication can then be routed, or re-routed, to the communication device which is proximate to the user. The central processor 105 can instruct the communication system 120 to route the incoming communication to a different communication address, i.e., a different telephone number or the like.

In another example, the incoming message can be redirected to another communication system which may utilize a different communication channel than the original communication system. That is, an incoming call can be sent to voice mail, converted to text via a speech recognition engine, and then sent as a text message or electronic mail to an alternate communication device and corresponding communication address.

FIGS. 2 and 3 are tables illustrating various states which can be specified within a user profile in accordance with another aspect of the present invention. As shown, the tables of FIGS. 2 and 3 depict various processing strategies or decisions for routing communications according to different states. The states correspond to the location of a user as determined by the central controller.

FIG. 2 is a table illustrating telephone call handling in accordance with another aspect of the present invention. The table depicted in FIG. 2 can be incorporated into a user profile to indicate how incoming telephone calls are to be directed in accordance with user-specified preferences. User profile information can be stored with the data storage device of the central controller, for example. The data can be specified as a 3-dimensional decision matrix.

The left column of the table in FIG. 2 indicates various states that can be determined for a given user by the central controller. Each state can correspond to a location of a user or the proximity of the user with respect to various communication devices. "At Desk" is a state which can indicate that the central controller has determined that the user is located at, or near, his or her own desk. As such, access to the user's workstation (computer system) is available and access to communication systems such as electronic mail, instant messaging, and a landline can be assumed by the central controller. Accordingly, when the central controller determines that the user is located "At Desk", the central controller can instruct the instant messaging system to change the user's status to "Ready". Further, the central controller can instruct the telephony system to route incoming calls directed to the user, or a telephone number associated with the user, to the user's landline. As shown, calls can be directed to the user's landline first and alternatively to the user's mobile phone. Thus, for example, if the user is determined to be "At Desk", the user can be automatically logged into the workstation and the status and routing rules noted above can be invoked.

When the user is determined to be "Roaming the Office", i.e., the user is in the office but is not at his or her own desk, the central controller can instruct the instant messaging system to change the user's status to "Away". The central controller can instruct the telephony system to route telephone calls originally directed to the user's landline to the user's mobile phone. If the user is determined to be "At Another Location", meaning that the user has been located at the workstation, for example, of a co-worker, the instant messaging status of the user can be set to "Ready". Incoming telephone calls intended for the user first can be directed to the landline that is associated with the workstation at which the user is located, despite that landline belonging to the co-worker. If that is not successful, the incoming telephone call can be directed to the user's mobile phone. If the user is determined to be "Out of Office", the user can be logged off of the instant messaging system. Further, calls can be automatically sent to the user's voice mail.

FIG. 3 is a table illustrating text message handling in accordance with another aspect of the present invention. As shown, when the central controller determines that the user is located "At Desk", the central controller instructs the instant messaging system to give the user a status of "Ready" so that messages can be sent to the user's instant messaging account or communication address. When the user is determined to be "Roaming the Office", the central controller can notify the instant messaging system to set the status of the user to "Away". Further, instant messages can be routed to the user's mobile phone using Short Message Service (SMS).

When the user is determined to be "At Another Location" by the central controller, the central controller can instruct one or more systems, i.e., the instant messaging system, a telephony system, etc., to convert incoming text messages to audio using text-to-speech technology and route such communications to the user's landline or mobile phone in the order specified. The user can listen to the messages as delivered or retrieve messages from voice mail. If the user is determined to be out of the office, text messages can be delivered to the user's mobile phone using SMS or to the user's landline using text-to-speech technology, i.e., as a voice mail.

As noted above, the processing rules can indicate that a particular communication is to be format converted and sent, via a different communication channel to an alternate communication address and corresponding communication device. If, for example, a communication was intended to be sent to an instant messaging client, where the communication channel is effectively a text message, and the user profile indicates that the text message is to be format converted and delivered via a telephony communication channel, i.e., using text-to-speech technology, the central controller can coordinate such action between the involved communication systems. That is, the central controller can cause the instant messaging system to send the text message to a message translation service or system, instruct the translation system to translate the text message into an audio message, cause the audio message to be delivered to the telephony system, and instruct the telephony system to deliver the resulting audio message to a particular telephone number.

Figure 4:
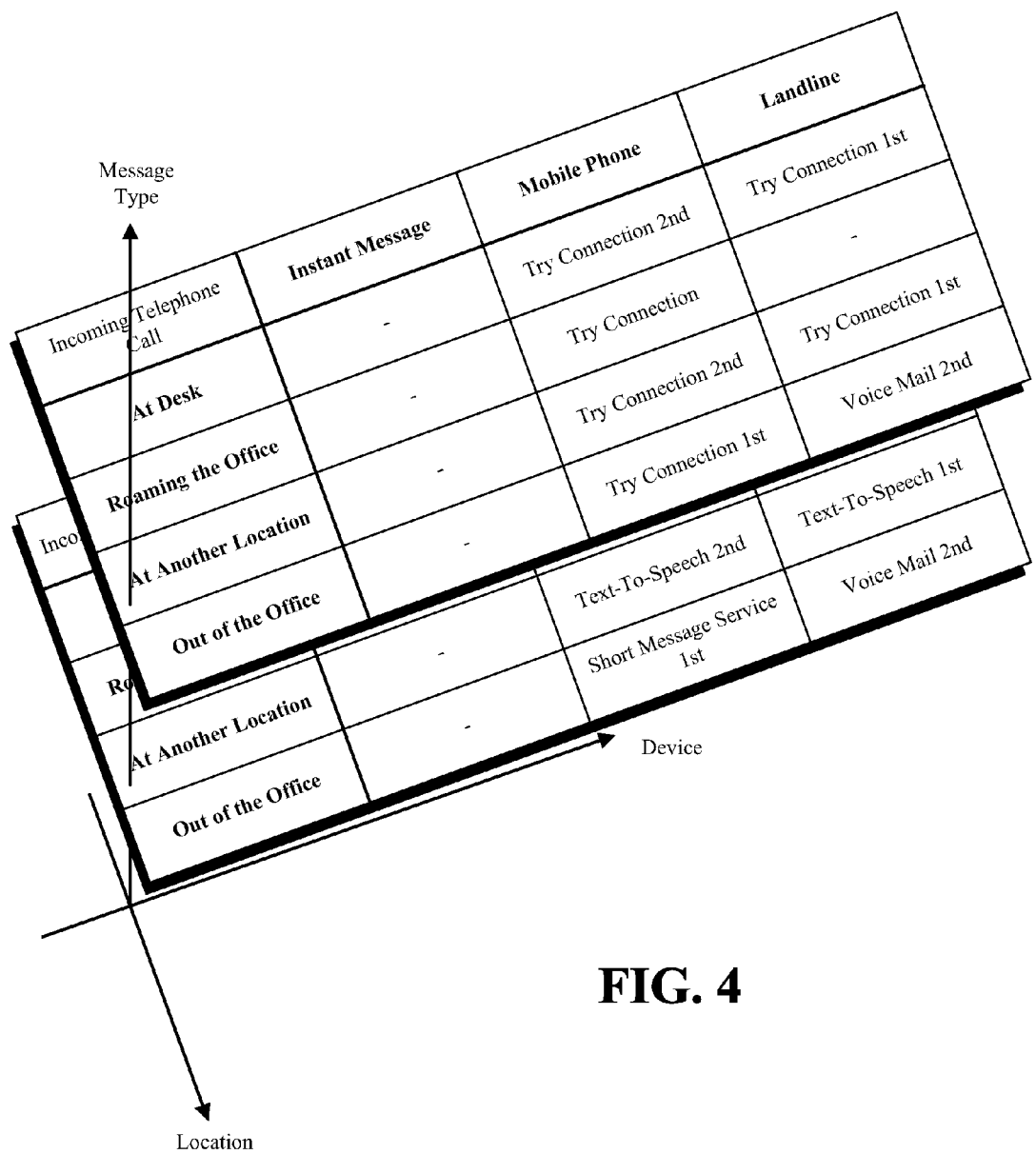
FIG. 4 is an example of a 3-dimensional decision matrix configured in accordance with one embodiment of the present invention.

FIG. 4 is an example of a 3-dimensional decision matrix configured in accordance with one embodiment of the present invention. As shown, the tables from both FIGS. 2 and 3 are arranged in 3-dimensions with axes corresponding to message type, location, and device. The decision matrix of FIG. 4 can be expanded along any of the three different axes as further locations (or location states), devices, and/or message types are incorporated or added to a given system.

Figure 5:
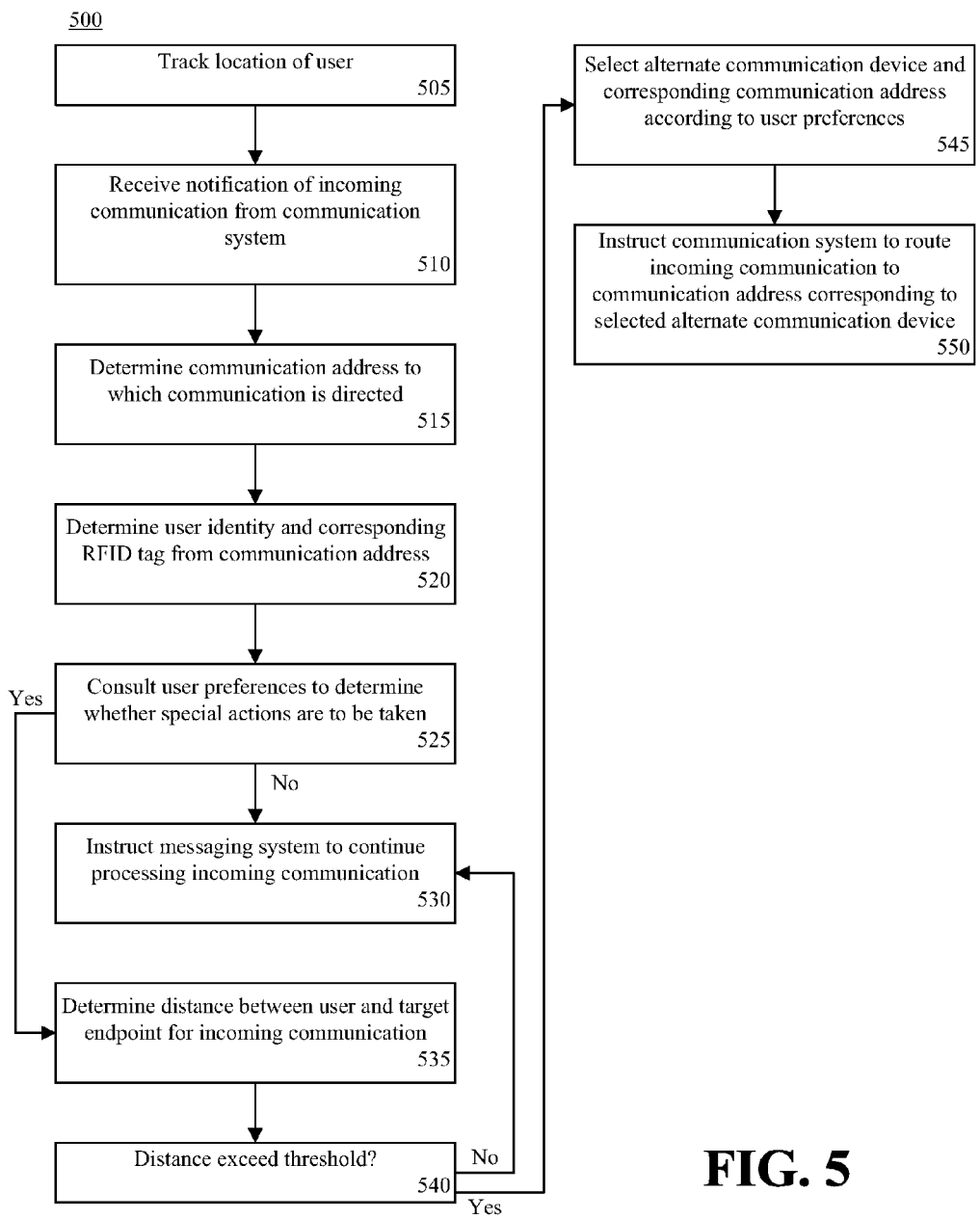
FIG. 5 is a flow chart illustrating a method of routing messages in accordance with yet another aspect of the present invention.

FIG. 5 is a flow chart illustrating a method 500 of routing messages in accordance with another embodiment of the present invention. The method can begin in step 505, where the central controller can begin tracking the location of one or more users. The position of one or more RFID tags can be tracked. As noted, the RFID tags can be attached to one or more users and/or devices. Each of the RFID tags, when read, can provide a unique identifier that can be logically associated with a particular user and/or device as the case may be.

In step 510, the central controller can receive a notification from a communication system, i.e., a telephony system, that an incoming communication is being, or has been, received. The notification to the central controller can specify a communication address, which in the case of a telephone call can be a telephone number. In step 515, the central controller can determine the communication address to which the incoming communication is to be directed from the notification.

In step 520, a user identity associated with the communication address can be identified. An RFID tag associated with the user identity also can be identified. In step 525, a user profile, including user preferences, as may be stored within the data store of the central controller, can be consulted to determine if any special handling of the incoming communication to the user is to be implemented. As noted, the central controller can include user profiles specifying how message are to be handled or routed per rules that can be predetermined and established by system administrators or users. If special handling is required, the method can proceed to step 535. If not, the method can continue to step 530. In step 530, the central controller can instruct the communication system to continue processing the incoming message, for example, by sending or routing the incoming communication to the original communication address and corresponding communication device specified in the notification of step 510. Alternatively, the central controller can take no action and allow the communication system to process the incoming communication uninterrupted.

Continuing with step 535, in the case where the user preferences indicate that special handling is applicable, the central controller can determine the distance between the RFID tag and the communication device associated with the determined communication address (target endpoint). In step 540, a determination can be made by the central controller as to whether the distance between the RFID tag and the communication device exceeds a predetermined threshold. If so, the method can proceed to step 545. If not, the method can continue to step 530 to continue processing as described.

In step 545, an alternate communication device can be selected to which the incoming communication will be delivered. The alternate communication device can be selected according to the user profile. It should be appreciated that user preferences can account for the location of the user as discussed with reference to FIGS. 2 and 3 in terms of assigning the user a particular location (state) according to whether the user is detected on premises, at his or her desk, is at another user's desk, etc. In another example, the user preferences can specify that the central controller should locate a communication device that is proximate to the user and select that communication device as the alternate communication device. In yet another example, the preferences can specify that the communication should be directed to a first alternate communication device, if unsuccessful, to a second alternate communication device, etc. Once an alternate communication device is selected, a communication address for the user for the selected alternate communication device can be determined.

In step 550, the central processor can instruct the communication system to route the incoming communication to the communication address corresponding to the selected, alternate communication device. It should be appreciated that if the original communication needs reformatting, the central controller can initiate such a process so that the communication is formatted according to the communication channel associated with the alternate communication device.

The steps described with reference to FIG. 5 present one possible embodiment of the present invention. Other embodiments can include automatically logging a user onto a particular communication device when the user is proximate to that communication device. For example, the central controller can track the location of a user and make a determination as to whether the user is proximate to a communication device. If so, the central controller can instruct the communication device to which the user is proximate to perform a predetermined function. That function can include automatically logging the user into the communication device. Further, the status of the user, i.e., in terms of presence, can be altered when the user is logged in. Thus, for example, the user status in an instant messaging system can be automatically updated to "Ready". The status of the user with respect to one or more other communication systems also can be updated.

In another embodiment, when a user is already logged into a particular communication device, the central controller may detect that the user is no longer proximate to that device. In that case, the central controller can log the user out of that communication device and update the user's status, i.e., presence, on any of a variety of different communication systems to indicate that the user is "Away" or otherwise not available. As the user moves throughout an office environment, the user can be automatically logged into other devices as the user becomes proximate to such devices.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular embodiments only and is not intended to be limiting of the invention. As used herein, the singular forms "a", "an", and "the" are intended to include the plural forms as well, unless the context clearly indicates otherwise. It will be further understood that the terms "comprises" and/or "comprising", when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

Having thus described the invention of the present application in detail and by reference to the embodiments thereof, it will be apparent that modifications and variations are possible without departing from the scope of the invention defined in the appended claims.

What is claimed is:

1. A method of integrating devices using radio frequency identification (RFID) technology, the method comprising:
   tracking movement of an RFID tag, wherein the RFID tag is associated with a user;

determining proximity of the RFID tag to a printer;
accessing a user profile associated with the detected RFID tag;
transmitting a communication to the user based upon the user profile;
queuing a print job originated by the user while the RFID tag is not proximate to the printer; and
releasing the print job when the RFID tag is proximate to the printer.

2. The method of claim 1, further comprising
deleting the print job from a print queue if the RFID tag is not proximate to the printer within a predetermined amount of time from when the print job originated.

3. The method of claim 1, further comprising
logging the user into the printer.

4. The method of claim 1, further comprising
first determining that the RFID tag is no longer proximate to a first communication device.

5. The method of claim 4, further comprising
causing the user to be logged off of the first communication device.

6. The method of claim 4, further comprising:
receiving, from a communication system, a notification of an incoming communication directed to a first communication address associated with the first communication device;
identifying an intended recipient of the communication according to the first communication address, wherein the intended recipient is associated with an RFID tag;
determining a communication address for the printer; and
instructing the communication system to route the communication to the communication address for the printer.

7. A computer program product for integrating devices using radio frequency identification (RFID) technology comprising:
a computer readable storage having computer usable program code embodied therewith, the computer usable program code comprising:
computer usable program code configured to track movement of an RFID tag, wherein the RFID tag is associated with a user;
computer usable program code configured to determine proximity of the RFID tag to a printer;
computer usable program code configured to access a user profile associated with the detected RFID tag;
computer usable program code configured to transmit a communication to the user based upon the user profile;
computer usable program code configured to queue a print job originated by the user while the RFID tag is not proximate to the printer; and
computer usable program code configured to release the print job when the RFID tag is proximate to the printer.

8. The computer program product of claim 7, further comprising
computer usable program code configured to delete the print job from a print queue if the RFID tag is not proximate to the printer within a predetermined amount of time from when the print job originated.

9. The computer program product of claim 7, further comprising
computer usable program code configured to log the user into the printer.

10. The computer program product of claim 7, further comprising
computer usable program code configured to first determine that the RFID tag is not proximate to a first communication device.

11. The computer program product of claim 10, further comprising
computer usable program code configured to cause the user to be logged off of the first communication device.

12. The computer program product of claim 10, further comprising:
computer usable program code configured to receive, from a communication system, a notification of an incoming communication directed to a first communication address associated with the first communication device;
computer usable program code configured to identify an intended recipient of the communication according to the first communication address, wherein the intended recipient is associated with an RFID tag;
computer usable program code configured to determine a communication address for the printer; and
computer usable program code configured to instruct the communication system to route the communication to the communication address for the printer.

* * * * *